US010604061B2

(12) United States Patent
Huang et al.

(10) Patent No.: US 10,604,061 B2
(45) Date of Patent: Mar. 31, 2020

(54) HEADLIGHT SYSTEM AND METHOD FOR HEADLIGHT DIRECTION CONTROL

(71) Applicants: Shanghai XPT Technology Limited, Shanghai (CN); INTELLIGENCE & PARTNER LIMITED, Hong Kong (HK); Mindtronic AI Co., Ltd., Grand Cayman (KY)

(72) Inventors: Mu-Jen Huang, Taipei (TW); Ya-Li Tai, Taoyuan (TW); Yu-Sian Jiang, Kaohsiung (TW)

(73) Assignees: Shanghai XPT Technology Limited, Shanghai (CN); INTELLIGENCE & PARTNER LIMITED, Hong Kong (HK); Mindtronic AI Co., Ltd., Grand Cayman (KY)

( * ) Notice: Subject to any disclaimer, the term of this patent is extended or adjusted under 35 U.S.C. 154(b) by 88 days.

(21) Appl. No.: 15/878,427

(22) Filed: Jan. 24, 2018

(65) Prior Publication Data
US 2019/0084470 A1    Mar. 21, 2019

(30) Foreign Application Priority Data

Sep. 20, 2017  (CN) .......................... 2017 1 0855718
Sep. 20, 2017  (CN) ...................... 2017 2 1209543 U (51) Int. Cl.
*B60Q 1/08* (2006.01)
*G06F 3/01* (2006.01)

(52) U.S. Cl.
CPC ............... *B60Q 1/08* (2013.01); *B60Q 1/085* (2013.01); *G06F 3/013* (2013.01); *B60Q 2300/23* (2013.01)

(58) Field of Classification Search
CPC ....... B60Q 2300/23; B60Q 1/08; B60Q 1/085
USPC ........................................................... 701/49
See application file for complete search history.

(56) References Cited

U.S. PATENT DOCUMENTS

| | | | | |
|---|---|---|---|---|
| 9,789,808 B1* | 10/2017 | Hong | ..................... | B60Q 1/085 |
| 2009/0016073 A1* | 1/2009 | Higgins-Luthman | ........................ | |
| | | | | B60Q 1/085 362/465 |
| 2016/0068097 A1* | 3/2016 | Langkabel | ........... | B60Q 1/1423 362/464 |
| 2016/0152173 A1* | 6/2016 | Mayer | .................... | B60Q 1/085 362/466 |

* cited by examiner

*Primary Examiner* — Anh T Mai
*Assistant Examiner* — Michael Chiang
(74) *Attorney, Agent, or Firm* — Winston Hsu (57) ABSTRACT

A headlight system includes a headlight module having at least one headlight device arranged on a vehicle and having a predefined illuminating range; a driving module having at least one driving unit configured to adjust the illuminating direction of the headlight device within the predefined illuminating range; a gaze detecting device detecting a driver's gaze direction; an input device receiving a direction adjusting command issued by the driver; and a control unit electrically connected to the driving module, the gaze detecting device and the input device, wherein when the input device receives the direction adjusting command from the driver, and the control unit determines whether the drivers' gaze direction falls within the predefined illuminating range; if so, the control unit controls the driving unit to adjust the illuminating direction of the headlight device toward the driver's gaze direction.

20 Claims, 6 Drawing Sheets

HEADLIGHT SYSTEM AND METHOD FOR HEADLIGHT DIRECTION CONTROL

BACKGROUND OF THE INVENTION

1. Field of the Invention

The present invention relates to a headlight system and a method of controlling the headlight system, and more particularly, to a headlight system and method for controlling the headlight system to illuminate toward a driver's gaze direction.

2. Description of the Prior Art

A conventional headlight illuminates a certain range of the roads ahead of a vehicle to provide visions to the driver especially when the natural light is poor. Typically, a headlight's illuminating direction is controlled entirely by the steering wheel in a vehicle. More precisely, when a driver in a vehicle turns the steering wheel left, the headlights will also turn left, thereby illuminating the mere left area in front of the vehicle. One problem of such design is objects not in the direct driving direction cannot be illuminated and therefore cannot be seen without the driver's turning the steering wheel. For instance, if the driver is driving straight ahead, he/she would not be able to see traffic signs or wild animals on the roadsides.

SUMMARY OF THE INVENTION

The present invention provides a headlight system and method for controlling headlight directions.

In one embodiment of the present invention, a headlight system includes a headlight module, a driving module, a gaze detecting device, an input device and a control unit. The headlight module has at least one headlight device arranged on a vehicle and the headlight device has a predefined illuminating range. The driving module includes at least one driving unit configured to adjust an illuminating direction of the headlight device within the predefined illuminating range. The gaze detecting device is configured to detect a driver's gaze direction in the vehicle. The input device is configured to receive a direction adjusting command issued by the driver. The control unit is electrically connected to the driving module, the gaze detecting device and the input device. When the input device receives the headlight direction adjusting command from the driver, the control unit determines whether the driver's gaze direction falls within the predefined illuminating range; if so, the control unit controls the driving unit to adjust the headlight device to illuminate toward the driver's gaze direction.

In another embodiment of the present invention, a method of controlling an illuminating direction of a headlight device in a vehicle includes providing a headlight module, wherein the headlight module has at least one headlight device having a predefined illuminating range; detecting a driver's gaze direction; and when receiving a direction adjusting command issued by the driver, determining whether the driver's gaze direction falls within the predefined illuminating range; if so, turning the headlight device to illuminate toward the driver's gaze direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
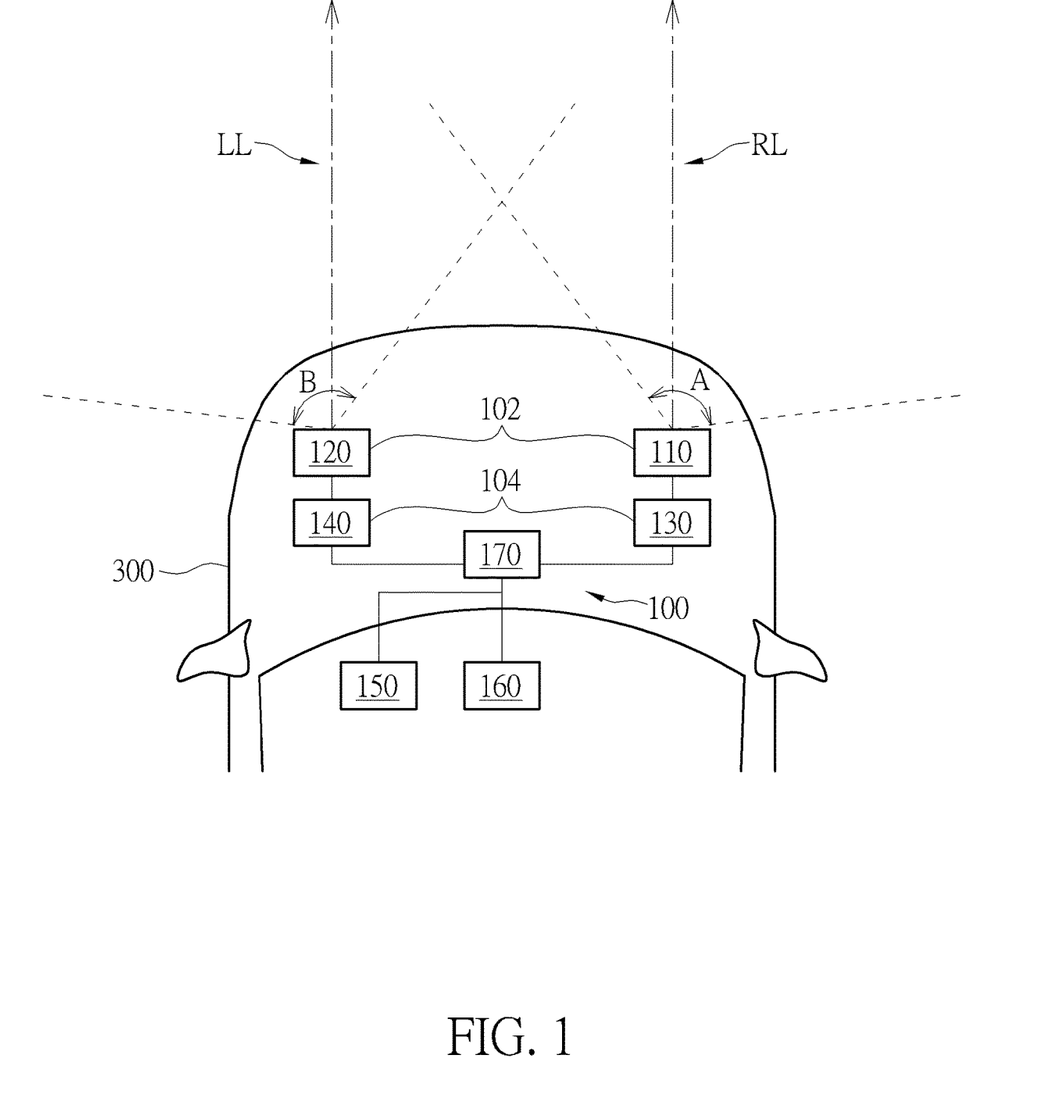
FIG. 1 is a diagram showing a headlight system according to one embodiment of the present invention.

FIG. 1 illustrates a headlight system according to one embodiment of the present invention. As shown, a headlight system 100 is arranged on a vehicle 300. The headlight system 100 has a headlight module 102, a driving module 104, a gaze detecting device 150, an input device 160 and a control unit 170. The headlight module 102 may further include a first headlight device 110 and a second headlight device 120. The first headlight device 110 has a first predefine illuminating range and is arranged on the right-hand side of the vehicle 300; while the second headlight device 120 has a second predefined illuminating range and is arranged on the left-hand side of the vehicle 300. The driving module 104 may further include a first driving unit 130 and a second driving unit 140. The first driving unit 130 adjusts the illuminating direction of the first headlight device 110 to illuminate areas within the first predefined illuminating range A. The second driving unit 140 adjusts the second headlight device 120 to illuminate areas within the second predefined illuminating range B. The first predefined illuminating range A covers the range in which an optic axis RL of the first headlight device 110 can sweep. The second predefined illuminating range B covers the range in which an optic axis LL of the second headlight device 120 can sweep. The gaze detecting device 150 is configured to detect the driver's gaze direction in the vehicle 300. For example, the gaze detecting device 150 can detect an angle difference between the driver's gaze direction and a central axis of the vehicle 300. The input device 160 receives a headlight direction adjusting command issued by the driver. In the present invention, the input device 160 can be either a voice input device, an image capturing device, a touch device, a button, or any combination of the above. The headlight direction adjusting command can be made through, for instance without limitation, a voice, a gesture, a touch, a trigger signal from a button, or any combination of the above. The control unit 170 is electrically connected to the driving module 104, the gaze detecting device 150 and the input device 160. When the input device 160 receives the direction adjusting command issued by driver, the control unit 170 controls the first driving unit 130 and the second driving unit 140, altogether or independently, to adjust the first headlight device 110 and the second headlight device 120 to illuminate toward the driver's gaze direction.

Figure 2:
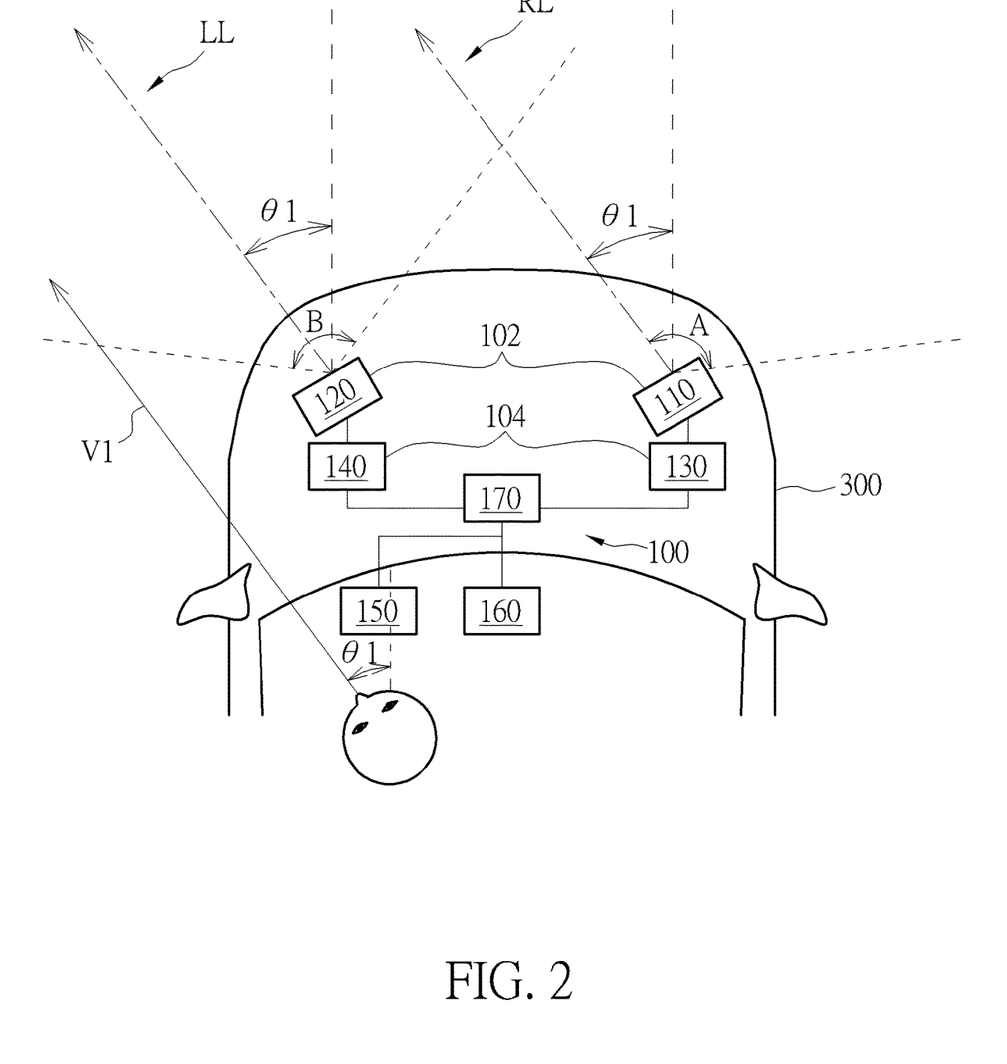
FIG. 2 is a diagram showing the exemplary embodiment of adjusting an illuminating direction of the headlight system of the present invention based on a driver's gaze direction.

FIG. 2 is an exemplary embodiment of adjusting the headlight system of the present invention based on a driver's gaze direction. In the scenario, while the driver in the vehicle 300 is looking toward a direction V1, the driver may issue a direction adjusting command to the input device 160. Next, the control unit 170 determines whether the direction V1 falls within a first predefined illuminating range A and a second predefined illuminating range B, respectively. The determination may be made by reference to, for instant, angle differences. Assuming the angle difference between the direction V1 and the central axis of the vehicle 300 is θ1. If angle difference θ1 is no larger than the maximum angles the first headlight device 110 and the second headlight device 120 can turn, i.e. the maximum angles the optic axes RL and LL can sweep within the first predefined illuminating range A and the second predefined illuminating range B, it then can be determined that the direction V1 falls within the first predefined illuminating ranges A and the second predefined illuminating range B. There could be other ways to determine whether the direction of the driver's gaze is within the ranges where the headlight devices in the present invention can reach. The above manner does not intend to be any limitation. Once determined, the control unit 170 controls the first driving unit 130 to adjust the first headlight device 110 at the angle identical to the angle difference θ1, and controls the second driving unit 140 to adjust the second headlight device 120 also at the angle of θ1. Consequently, the first headlight device 110 and the second headlight device 120 both illuminate toward the direction V1.

Figure 3:
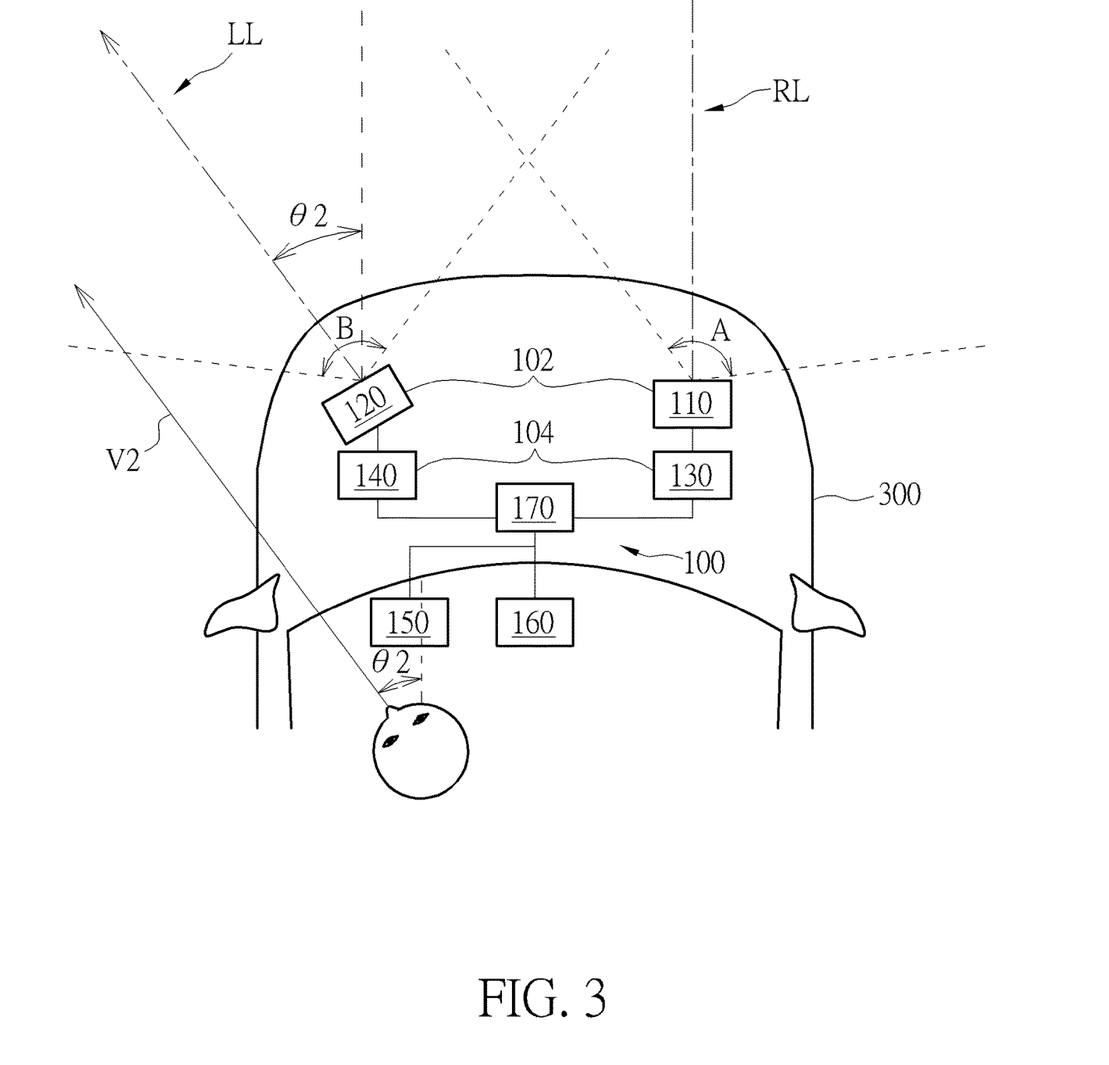
FIG. 3 is a diagram showing the exemplary embodiment of adjusting an illuminating direction of the headlight system of the present invention based on a driver's gaze direction.

FIG. 3 is the exemplary embodiment of adjusting the headlight system of the present invention based on a driver's gaze direction. In the scenario, while the driver in the vehicle 300 is looking toward a direction V2, the driver may issue a direction adjusting command to the input device 160. Next, the control unit 170 determines whether the direction V2 falls within a first predefined illuminating range A and a second predefined illuminating range B, respectively. Similarly, the determination may be made by reference to angle differences. Assuming the angle difference between the direction V2 and the central axis of the vehicle 300 is θ2. It turns out the direction V2 falls within the second predefined illuminating range B but outside the first predefined illuminating range A because the angle θ2 is less than the maximum angle the second headlight device 120 can turn (i.e. the maximum angle the optic axis LL can sweep within the second predefined illuminating range B) but larger than the maximum angle the first headlight device 110 can turn (i.e. the maximum angle the optic axis RL can sweep within the first predefined illuminating range A). Once determined, the control unit 170 controls the second driving unit 140 to adjust the second headlight device 120 at the angle of θ2. Consequently, the second headlight device 120 illuminates toward the direction V2. Additionally, as discussed, the direction V2 is outside the first predefined illuminating range A. In such circumstance, in one embodiment, the first headlight device 110 may not be adjusted at all. Alternatively, the first headlight device 110 may return to its initial direction, e.g. the central position in line with the optic axis RL. As a result, the first headlight device 110 illuminates straight ahead.

Figure 4:
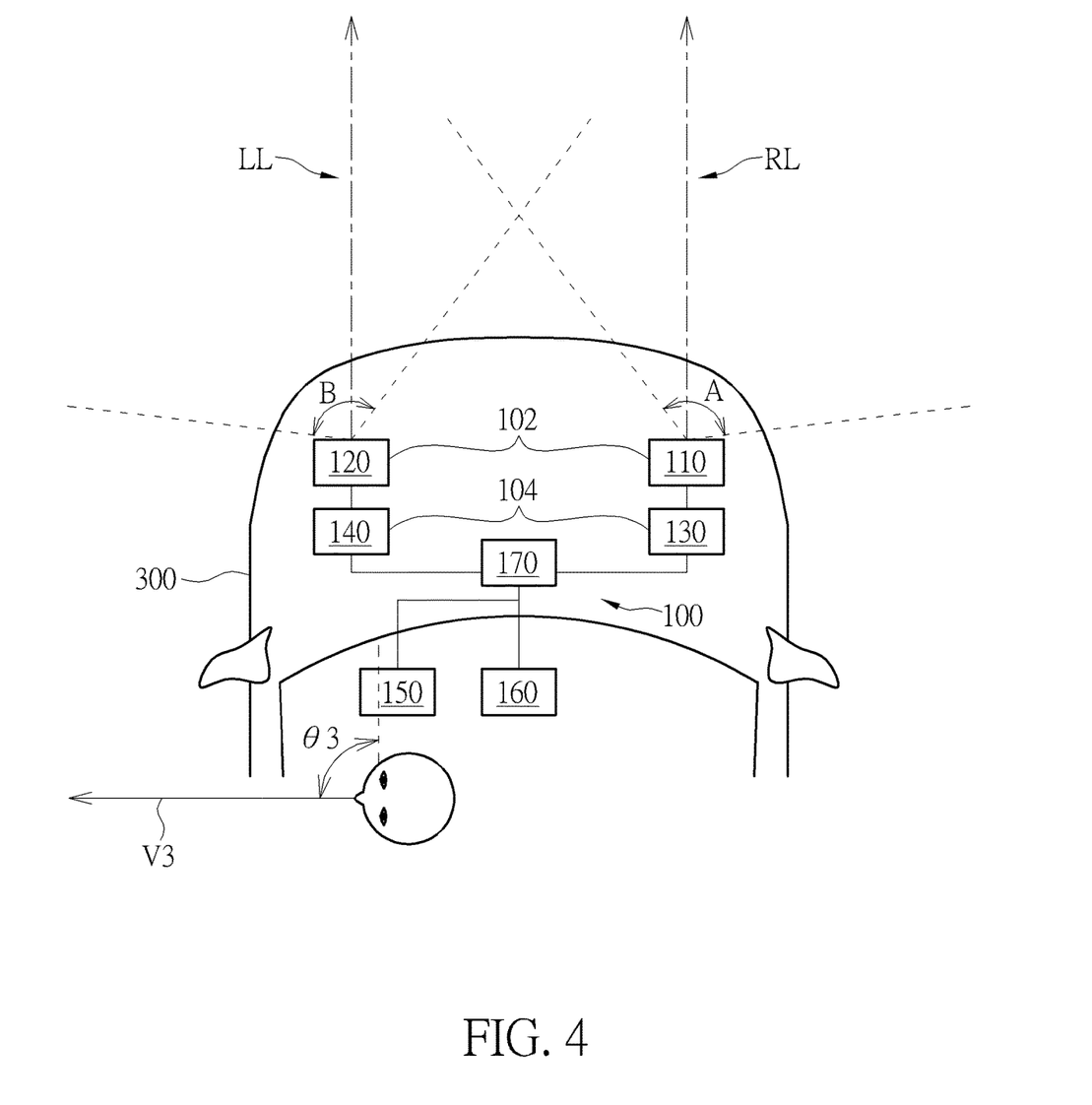
FIG. 4 is a diagram showing the exemplary embodiment of adjusting an illuminating direction of the headlight system of the present invention based on a driver's gaze direction.

FIG. 4 is the exemplary embodiment of adjusting the headlight system of the present invention based on a driver's gaze direction. In the scenario, while the driver in the vehicle 300 is looking toward a direction V3, the driver may issue a direction adjusting command to the input device 160. Next, the control unit 170 determines whether the direction V3 falls within a first predefined illuminating range A and a second predefined illuminating range B, respectively. Similarly, the determination may be made by reference to angle differences. Assuming the angle difference between the direction V3 and the central axis of the vehicle 300 is θ3. It turns out the direction V3 falls outside both the first predefined illuminating range A and the second predefined illuminating range B because the angle θ3 is larger than the maximum angles that both the headlight devices 110 and 120 can turn, i.e. larger than the maximum angles both optic axes RL and LL can sweep within the first and the second predefined illuminating ranges A and B. In such circumstance, in one embodiment, neither the first headlight device 110 nor the second headlight device 120 is adjusted. Alternatively, both the first headlight device 110 and the second headlight device 120 may return to their initial directions respectively, i.e. the central positions in line with the optic axes RL and LL. As a result, the first headlight device 110 and the second headlight device 120 illuminate straight ahead.

According to the present invention, the driver's gaze direction is monitored and detected. If the driver of the vehicle 300 issues a direction adjusting command to change the headlight direction, and it is determined that the driver's gaze direction falls within a predefined illuminating range, the control unit 170 then properly adjusts the illuminating direction of the headlight device. As a result, the headlight device illuminates toward the driver's gaze direction. Based on the foregoing, it appears that the headlight system 100 of the present invention is capable of adjusting its illuminating direction with the driver's gaze direction and thereby illuminating the corresponding areas. Even if the driver's gaze direction is not within the predefined illuminating range, the headlight system 100 of the present invention is also capable of returning the headlight device to the initial position. This design is to avoid unwanted headlight changes caused by the driver's sudden distraction which if do occur may harass the nearby drivers and result in terrible accidents.

Figure 5:
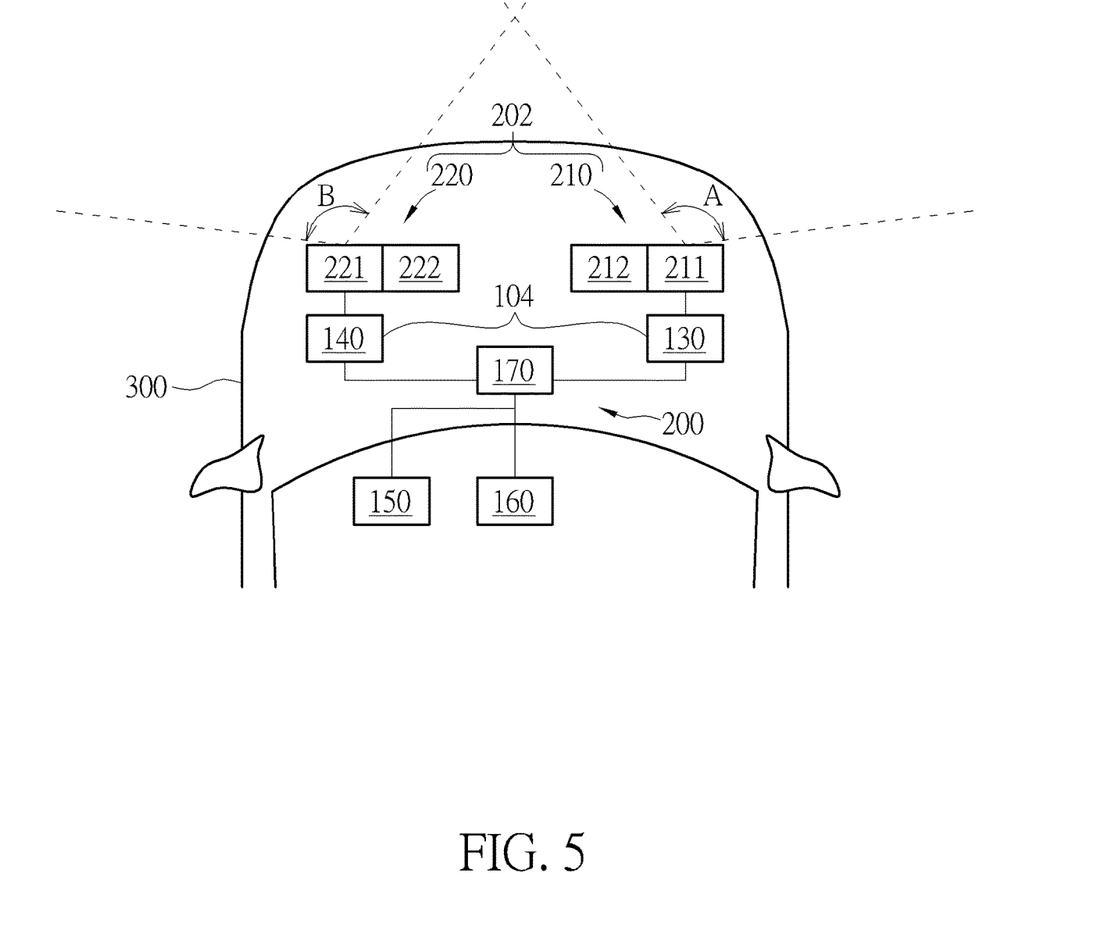
FIG. 5 is a diagram showing a headlight system according to another embodiment of the present invention.

FIG. 5 illustrates a headlight system in accordance with another embodiment of the present invention. As shown, a headlight system 200 may include a headlight module 202, a driving module 104, a gaze detecting device 150, an input device 160 and a control unit 170. The headlight module 202 may further include a first headlight device 210 and a second headlight device 220. The design of the headlight system 200 shown in FIG. 5 is similar to the design of the headlight system 100 shown in FIG. 1 except that the headlight device 200 equips with two illuminating units. More precisely, the first headlight device 210 includes a first fixed illuminating unit 212, and a first adjustable illuminating unit 211 having a first predefined illuminating range A; while the second headlight device 220 includes a second fixed illuminating unit 222, and a second adjustable illuminating unit 221 having a second predefined illuminating range B. The first driving unit 130 adjusts the illuminating direction of the first adjustable illuminating unit 211 to illuminate the area within the first predefined illuminating range A. The second driving unit 140 adjusts the illuminating direction of the second adjustable illuminating unit 221 to illuminate the area within the second predefined illuminating range B. The predefined illuminating range A covers the range in which the optic axis RL of the first headlight device 210 can sweep. The predefined illuminating range B covers the range in which the optic axis LL of the second headlight device 220 can sweep. The optic axis of the first fixed illuminating unit 212 and the optic axis of the second fixed illuminating unit 222 are parallel with the central axis of the vehicle 300. The control unit 170 is electrically connected to the first driving unit 130, the second driving unit 140, the gaze detecting device 150 and the input device 160. When the input device 160 receives a direction adjusting command issued by the driver, the control unit 170 controls either the first driving unit 130, the second driving unit 140 or both of them to adjust the illuminating directions of the first adjustable illuminating unit 211 and the second adjustable illuminating unit 221 accordingly.

The way in which the driving module 104 operates to adjust the illuminating directions of the first adjustable illuminating unit 211 and the second adjustable illuminating unit 221 is identical to the operations discussed above. By equipped with the first fixed illuminating unit 212 and the second fixed illuminating unit 222, the headlight system 200 is capable of providing a constant illumination in front of the vehicle. Such design ensures that the driver will have sufficient vision ahead while the first and the second adjustable illuminating units 212 and 221 are turning away.

In the present invention, the first headlight device 210 and the second headlight device 220 may be LED arrays; part of them forms the fixed illuminating units and part of them forms the adjustable illuminating units. It should be noted that there may be other sorts of illuminating devices known to a person of ordinary skill in the art; the present invention should not be limited to LED arrays merely. Additionally, the driver of the vehicle may issue a reinstate command to move the headlight devices back to their initial positions.

The above embodiments illustrate only one headlight module, for instance, the headlight module 102. However, it should be noted that there could be multiple headlight modules disposed on the vehicle 300. Further, the headlight devices in the headlight module can each be a standalone headlight device like the embodiments discussed previously, or an integrated one. In either case, the operation is identical. Moreover, the headlight module may be arranged at anyplace, such as the center-front of the vehicle or the vehicle roof, to assist the driver.

Figure 6:
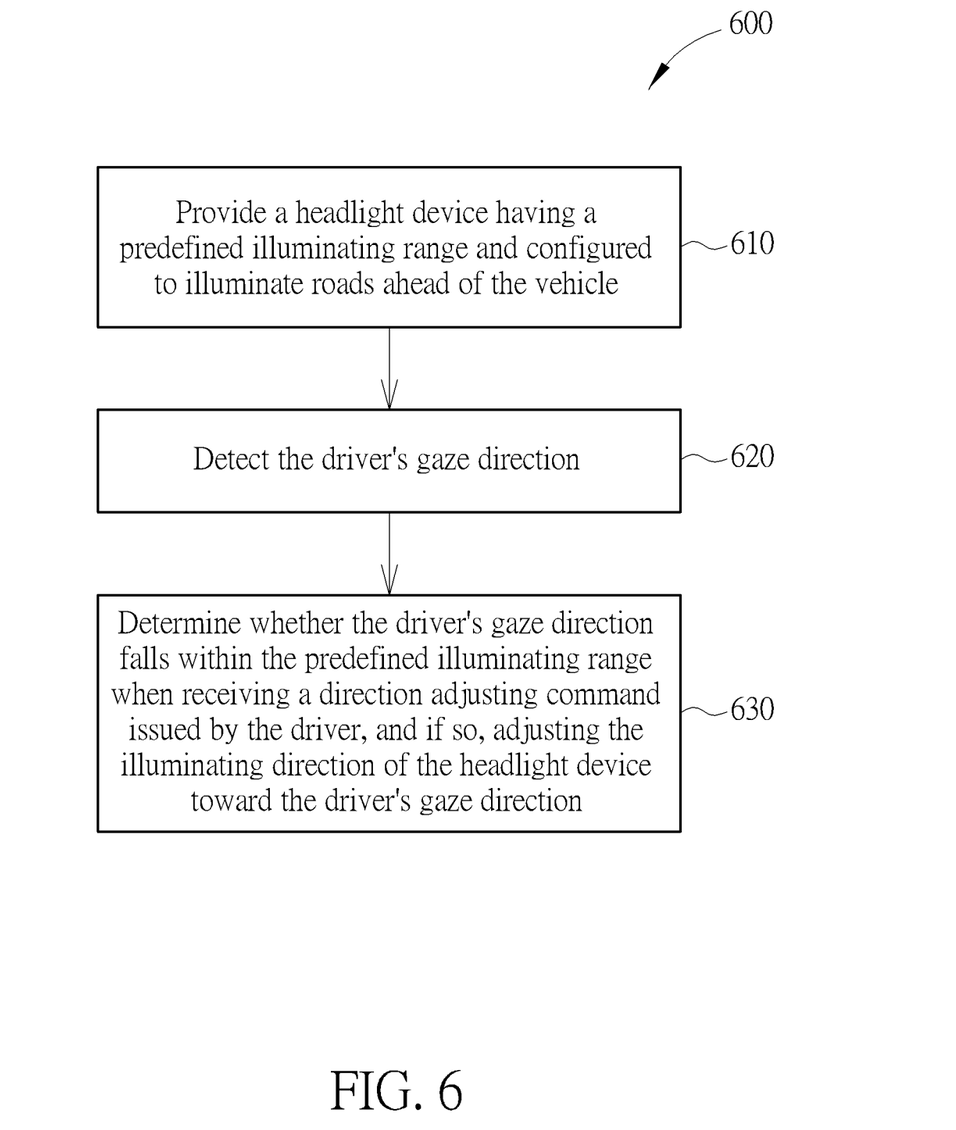
FIG. 6 is a flowchart showing the headlight direction control method of the present invention.

FIG. 6 is a flowchart 600 of a headlight direction control method in accordance with the present invention which may include the following steps:

Step 610: Provide a headlight device having a predefined illuminating range and configured to illuminate roads ahead of the vehicle;

Step 620: Detect the driver's gaze direction; and

Step 630: Determine whether the driver's gaze direction falls within the predefined illuminating range when receiving a direction adjusting command issued by the driver, and if so, adjusting the illuminating direction of the headlight device toward the driver's gaze direction.

The present invention is advantageous over the conventional art because the headlight system of the present invention allows the driver to control the headlight system to illuminate toward his/her gaze direction. Moreover, the headlight device in the present headlight system is designed to avoid harassing the nearby drivers. If it is determined that the driver's gaze direction is outside the predefined illuminating range, i.e. the area that the headlight device cannot reach, the headlight device will return to its initial position and illuminate straight ahead.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A headlight system of a vehicle, comprising:
a headlight module having at least one headlight device arranged on the vehicle that illuminating the road ahead of the vehicle, wherein the headlight device has a predefined illuminating range, wherein the predefined illuminating range is a maximum mechanically possible sweeping range of the headlight device;
a driving module having at least one driving device electronically connected to the headlight module and configured to adjust an illuminating direction of the headlight device within the predefined illuminating range;
a gaze detecting device configured to detect a driver's gaze direction;
an input device configured to receive a direction adjusting command issued by the driver; and
a control unit electrically connected to the driving device, the gaze detecting device and the input device, wherein when the input device receives the direction adjusting command from the driver, the control unit compares the driver's gaze direction with the predefined illuminating range, and if the driver's gaze direction is within the predefined illuminating range, the control unit is configured to adjust the illuminating direction of the headlight device toward the driver's gaze direction.

2. The headlight system of claim 1, wherein if it is determined that the driver's gaze direction falls outside the predefined illuminating range, the illuminating direction of the headlight device is either unchanged or return to its initial direction.

3. The headlight system of claim 1, wherein if the angle difference between the driver's gaze direction and the central axis of the vehicle is not greater than the maximum angle the headlight device can sweep within the predefined illuminating range, it is determined that the driver's gaze direction falls within the predefined illuminating range.

4. The headlight system of claim 1, wherein the headlight module further comprises: a first headlight device arranged on the first side of the vehicle and having a first predefined illuminating range, and a second headlight device arranging on the second side of the vehicle and having a second predefined illuminating range; and wherein the driving module further comprises: a first driving device configured to adjust an illuminating direction of the first headlight device within the first predefined illuminating range, and a second driving device configured to adjust an illuminating direction of the second headlight device within the second predefined illuminating range.

5. The headlight system of claim 4, wherein if it is determined that the driver's gaze direction falls within both of the first predefined illuminating range and the second predefined illuminating range, the control unit is configured to control the first driving device and the second driving device respectively to adjust the illuminating directions of the first headlight device and the second headlight device toward the driver's gaze direction.

6. The headlight system of claim 4, wherein if it is determined that the driver's gaze direction falls within the first predefined illuminating range but outside the second predefined illuminating range, the control unit is configured to control the first driving device to adjust the illuminating directions of the first headlight device toward the driver's gaze direction.

7. The headlight system of claim 6, wherein if it is determined that the driver's gaze direction falls within the first predefined illuminating range but outside the second predefined illuminating range, the illuminating direction of the second headlight device is either unchanged or returns to its initial direction.

8. The headlight system of claim 1, wherein the headlight device further comprises a fixed illuminating unit configured to illuminate straight ahead of the vehicle, and an adjustable illuminating unit adjusted by the driving unit to change its illuminating direction within the predefined illuminating range.

9. The headlight system of claim 1, wherein the input device may be a voice input device, an image capturing device, a button, a touch control device, or any combination of the above.

10. The headlight system of claim 9, wherein the direction adjusting command may be made through either a voice, a gesture, a trigger signal, a touch, or any combination of the above.

11. The headlight system of claim 1, wherein the input device further receives a reinstate command issued by the driver to return the headlight device to its initial position.

12. The headlight system of claim 1, wherein the headlight device is an LED array.

13. A method of controlling an illuminating direction of a headlight device in a vehicle, comprising:
  providing a headlight device having a predefined illuminating range and is configured to illuminate roads ahead of the vehicle, wherein the predefined illuminating range is a maximum mechanically possible sweeping range of the headlight device;
  detecting a driver's gaze direction; and
  comparing the driver's gaze direction with the predefined illuminating range when receiving a direction adjusting command issued by the driver, and if the driver's gaze direction falls within the predefined illuminating range, adjusting the illuminating direction of the headlight device toward the driver's gaze direction.

14. The method of claim 13, wherein if it is determined that the driver's gaze direction is outside the predefined illuminating range, the illuminating direction of the headlight device is either unchanged or return to its initial direction.

15. The method of claim 13, wherein if the angle difference between the driver's gaze direction and the central axis of the vehicle is no greater than the maximum angle the headlight device can sweep within the predefined illuminating range, it is then determined that the driver's gaze direction falls within the predefined illuminating range.

16. The method of claim 13 further comprising providing a first headlight device having a first predefined illuminating range, and a second headlight device having a second predefined illuminating range; wherein if it is determined that the driver's gaze direction falls within both of the first and the second predefined illuminating ranges, adjusting both of the illuminating directions of the first and the second headlight devices toward the driver's gaze direction.

17. The method of claim 16, wherein if it is determined that the driver's gaze direction falls within the first predefined illuminating range but outside the second predefined illuminating range, adjusting the illuminating direction of the first headlight device toward the driver's gaze direction.

18. The method of claim 17, further comprising either unchanging the illuminating direction of the second headlight device or returning the second headlight device to its initial position if it is determined that the driver's gaze direction falls within the first predefined illuminating range but outside the second predefined illuminating range.

19. The method of claim 13, wherein the driver may issue the direction adjusting command through a voice, a gesture, a trigger signal, or a touch command.

20. The method of claim 13, further comprising issuing a reinstate command by the driver to return the headlight device to its initial position.

* * * * *